(12) United States Patent
Walton

(10) Patent No.: US 10,355,532 B2
(45) Date of Patent: Jul. 16, 2019

(54) INDUCTIVE POWER TRANSFER

(71) Applicant: Apple Inc., Cupertino, CA (US)

(72) Inventor: Robert Walton, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/799,902

(22) Filed: Oct. 31, 2017

(65) Prior Publication Data

US 2018/0123399 A1    May 3, 2018

Related U.S. Application Data

(60) Provisional application No. 62/416,471, filed on Nov. 2, 2016.

(51) Int. Cl.

| | |
|---|---|
| H01F 27/42 | (2006.01) |
| H01F 37/00 | (2006.01) |
| H01F 38/00 | (2006.01) |
| H02J 50/12 | (2016.01) |
| H02J 50/80 | (2016.01) |
| H01F 38/14 | (2006.01) |

(52) U.S. Cl.
CPC .............. *H02J 50/12* (2016.02); *H01F 38/14* (2013.01); *H02J 50/80* (2016.02)

(58) Field of Classification Search
CPC ............ H02J 50/12; H02J 50/80; H01F 38/14
USPC ......................................................... 307/104
See application file for complete search history.

(56) References Cited

U.S. PATENT DOCUMENTS

| | | |
|---|---|---|
| 4,833,337 A | 5/1989 | Kelley et al. |
| 4,973,907 A | 11/1990 | Bergman et al. |
| 5,702,431 A | 12/1997 | Wang et al. |
| 6,515,878 B1 | 2/2003 | Meins et al. |
| 6,701,121 B2 | 3/2004 | Nami et al. |
| 8,093,758 B2 | 1/2012 | Hussmann et al. |
| 2007/0237273 A1 | 10/2007 | Tan et al. |
| 2008/0235869 A1 | 10/2008 | Matsuo |
| 2010/0171368 A1 | 7/2010 | Schatz et al. |
| 2011/0053500 A1 | 3/2011 | Menegoli et al. |
| 2011/0090723 A1 | 4/2011 | Hu et al. |
| 2011/0105023 A1 | 5/2011 | Scheer et al. |
| 2011/0193417 A1 | 8/2011 | Hirasaka et al. |

(Continued)

FOREIGN PATENT DOCUMENTS

| | | |
|---|---|---|
| CN | 101023600 A | 8/2007 |
| CN | 101902083 A | 12/2010 |

(Continued)

OTHER PUBLICATIONS

Boonyaroonate et al., "Analysis and Design of Class E Isolated DC/DC Converter Using Class E Low dv/dt PWM Synchronous Recrifier", IEEE Transactions on Power Electronics, Institute of Electrical and Electronics Engineers, USA, vol. 16, No. 4, Jul. 1, 2002 (Jul. 1, 2001), XP011043568, ISSN: 0885-8993.

(Continued)

*Primary Examiner* — Carlos Amaya
(74) *Attorney, Agent, or Firm* — Joseph F. Guihan

(57) ABSTRACT

An IPT receiver is controlled to vary its frequency of operation to hop between a first frequency below the transmitter frequency and a second frequency above the transmitter frequency while measuring the power transfer at both first and second frequencies. Embodiments may track variations in transmitter frequency.

16 Claims, 5 Drawing Sheets

(56) References Cited

U.S. PATENT DOCUMENTS

| | | |
|---|---|---|
| 2011/0254377 A1 | 10/2011 | Wildmer et al. |
| 2012/0267960 A1 | 10/2012 | Low et al. |
| 2014/0028108 A1 | 1/2014 | Hsu |
| 2015/0008755 A1* | 1/2015 | Sone .................. H02J 5/005 307/104 |
| 2016/0056638 A1 | 2/2016 | Hatanaka et al. |
| 2016/0059713 A1 | 3/2016 | Herriot et al. |
| 2016/0141920 A1 | 5/2016 | Bunsen et al. |

FOREIGN PATENT DOCUMENTS

| | | |
|---|---|---|
| CN | 103944388 A | 7/2014 |
| EP | 0609964 A2 | 8/1994 |
| EP | 1609501 A1 | 12/2005 |
| EP | 2985879 | 2/2016 |
| EP | 3101781 | 12/2016 |
| JP | 2000184625 | 6/2000 |
| JP | 2001238372 | 8/2001 |
| JP | 2005168246 A | 6/2005 |
| JP | 2005525705 | 8/2005 |
| JP | 2009201211 | 9/2009 |
| JP | 2009539343 A | 11/2009 |
| JP | 2011205761 | 10/2011 |
| JP | 2012060850 A | 3/2012 |
| JP | 2012130173 A | 7/2012 |
| JP | 2012191796 A | 10/2012 |
| KR | 10-2008-0096919 | 11/2008 |
| WO | 2004105208 A1 | 12/2004 |
| WO | 2008039945 A2 | 4/2008 |
| WO | 2009091267 A2 | 7/2009 |
| WO | 2010030195 A1 | 3/2010 |
| WO | 2011145953 A1 | 11/2011 |
| WO | 2012133446 A1 | 10/2012 |
| WO | 2013006068 A1 | 1/2013 |
| WO | 2013080212 A2 | 6/2013 |

OTHER PUBLICATIONS

Luk et al., "State-Space Modeling of a Class Ed Converter for Inductive Links", IEEE Transactions on Power Electronics. Institute of Electrical and Electronics Engineers, USA, vol. 30, No. 6, Jun. 24, 2014 (Jun. 24, 2014), pp. 3242-3251, XP011570281, ISSN: 0885-8993, DOI: 10.1103/TPEL.2014.2332451 [retrieved on Jan. 16, 2015].

Hirota et al., "Pratical evaluations of single-ended load resonant inverter using application-specific heating appliance", Power Electronics and Drive Systems, 1995., Proceedings of the 1995 Intern Ational Conference on Singapore 21-24 Feb. 1, New Your, NY, USA, IEEE, Feb. 21, 1995 (Feb. 21, 1995), pp. 531-537, XP010140703, DOI: 10.1109/PEDS.1995.404866, ISBN: 987-0/8703-2423-7.

Terai et al, "Comparative performance evaluations of IGBT's and MCT incorporated into voltage-source-type single-ended quasi-resonant zero-voltage soft switching inverter", Electrical Engineering in Japan, vol. 144, No. 3, Aug. 1, 2003 (Aug. 1, 2003), pp. 58-68, XP055504116, US ISSN: 0424-7760, DOI: 10.1002/eej. 10151.

Omori et el, A new resonant IPT-wireless EV charging system with single-ended quasi-resonant inverter for home use, 2013 IEEE 14th Workshop on Control and Modeling for Power Electronics (Compel). IEEE, Jun. 23, 2013 (Jun. 23, 2013), pp. 1-7, XP032500858, ISSN: 1093-5142, DOI: 10.1109/COMPEL.2013.6626448 [retrieved on Oct. 9, 2013].

* cited by examiner

INDUCTIVE POWER TRANSFER

This patent application claims the benefit of U.S. provisional patent application No. 62/416,471, filed on Nov. 2, 2016, which is hereby incorporated by reference herein in its entirety.

FIELD

The present invention is in the general field of inductive power transfer (hereinafter often referred to as "IPT"). Embodiments relate to a method of operating an IPT system, a method of controlling power transfer in an IPT system, an IPT system, and a receiver for an IPT system.

BACKGROUND

IPT systems are finding increasingly wide application, including small devices such as electric toothbrushes and higher power applications such as electric car charging.

A typical IPT system consists of two main blocks, the power transmitter (hereinafter "transmitter") and power receiver (hereinafter "receiver") which form a unidirectional power train using the B-field coupling. The transmitter usually includes a converter driving a transmit winding/coil at a transmitter frequency typically between 10 kHz and 1 MHz The receiver has a receiver winding/coil, and may include a receiver converter which converts the transmitter frequency to DC. In other arrangements the receiver converter may provide an AC output.

The transmitter frequency may be fixed but more usually varies, for example due to load conditions, environmental conditions, and coupling conditions.

Losses occur in a number of situations but specifically where the receiver operates at a frequency substantially different to the transmitter frequency. Where a transmitter is resonant, some prior art mitigates this by using a relatively flat (i.e. relatively low Q) resonant characteristic.

FIG. 1 shows two illustrative resonant curves, Qx and Qy, with Qy being high Q relative to Qx. These are plotted against power transfer, W. Both curves have a resonant frequency of fr and it will be seen that operating at a frequency f1 being in this illustrative example a lower frequency than fr causes a relatively small loss in power $\Delta 1$ on Qx. On the other hand for the high Q situation operating at the frequency f1 causes a much larger loss in power $\Delta 2$ on Qy.

SUMMARY

The present invention may provide an improved method of operating an IPT system or at least provide the public with a useful choice.

In a broad aspect there is provided a high Q IPT system in which power to a load is optimized by operating a power receiver at a frequency determined to be the transmit frequency.

In one aspect there is provided a method of operating an IPT system, the system comprising a first device for transmitting power at a transmit frequency and a second device for receiving power inductively from the first device, the method comprising determining the transmit frequency at which the first device operates, and causing the second device to operate alternatively above and below the transmit frequency.

The method may include sensing the transmit frequency by determining relative power transfer at the two frequencies.

In another aspect there is provided a method of operating an IPT system, the system comprising a transmitter for transmitting power at a transmit frequency and a receiver for receiving power inductively from the first device, the method comprising causing the receiver to operate at a first frequency above the transmit frequency and at a second frequency below the transmit frequency, sensing the power transferred at each of the first and second frequencies and varying the first and second frequencies until the powers transferred are within a threshold difference.

The method may comprise measuring the transmit frequency.

The method may comprise selecting the first frequency and the second frequency on the basis of an anticipated transmit frequency.

In yet another aspect there is provides a method of controlling power transfer in an IPT system, the system comprising a transmitter operating at a transmit frequency and a receiver, the method comprising causing the receiver to operate at a first frequency above the transmit frequency and at a second frequency below the transmit frequency, wherein the powers transferred at the first and second frequencies are within a threshold difference, and selecting differences between the transmit frequency and the first and second frequencies to control power transfer to a load.

The differences may have equal magnitude.

The method may further comprise causing the receiver to operate at a first frequency above the transmit frequency and at a second frequency below the transmit frequency, sensing the power transferred at each frequency and varying the first and second frequencies until the powers transferred are within a threshold difference to determine the transmit frequency.

In still another aspect there is provided an IPT system comprising a transmitter for transmitting power, a receiver for receiving power inductively from the first device and a controller configured to sense a transmit frequency at which the transmitter operates; and to cause the receiver to operate alternately above and below the transmit frequency.

In a further aspect there is provided an IPT system, the system comprising a transmitter for transmitting power, a receiver for receiving power inductively from the transmitter and a controller for varying the operating frequency of the receiver, the controller being configured to cause the receiver to operate at a first frequency above an expected transmit frequency and at a second frequency below the expected transmit frequency, and to vary the first and second frequencies until the powers transferred by the transmitter to the receiver at the first and second frequencies are within a threshold difference.

In a yet further aspect there is provided an IPT system, the system comprising a transmitter operating at a transmit frequency, a receiver and a controller for controlling the receiver, the controller being configured to cause the receiver to operate at a first frequency above the transmit frequency and at a second frequency below the transmit frequency, with powers transferred at the first and second frequencies being within a threshold difference; and to select differences between the first and second frequencies to control power transfer to a load.

In a still further aspect there is provided a receiver for receiving power from the transmitter of an IPT, the receiver having a controller for setting its frequency of operation, the controller being configured to set the receiver frequency to a first frequency below the expected frequency of operation of the transmitter and to a second frequency above the expected frequency of operation of the transmitter, and to vary the first and second frequencies until powers transferred to the receiver at the first and second frequencies within a threshold difference.

There is also disclosed a receiver for an IPT system having a transmitter operating at a transmit frequency, the receiver having a controller configured to causing the receiver to operate at a first frequency above an expected transmit frequency and at a second frequency below the expected transmit frequency, wherein the powers transferred at the first and second frequencies are within a threshold difference, and the controller further configured to select a difference between the transmit frequency and the first and second frequencies to control power transfer to a load.

The transmit frequency may vary dynamically.

Variation in transmit frequency may not be deterministic. Variation may such that the frequency cannot be readily calculated, or cannot be calculated fast enough to allow the frequency to be tracked on the basis of calculations.

The transmitter may be operated to switch at or close to a zero voltage or current crossing.

The transmitter may be hard-switched.

The transmit frequency may be determined by a resonant circuit, the resonant circuit comprising reactances of the transmitter and a reactance of the receiver.

Alternatively the transmitter may be non-resonant.

The receiver may hop in frequency around the transmit frequency or around a predicted transmit frequency, the power transferred at each frequency is sensed and the hop frequencies are varied until the powers transferred are within a threshold difference.

The receiver may comprise a resonant circuit playing a part in determining the frequency of operation of the transmitter.

A variable capacitance diode such as a varactor/varicap may form part of the resonant circuit for effecting frequency control.

A saturable inductor may form part of the resonant circuit for effecting frequency control.

A ferrite may form part of the resonant circuit for effecting frequency control.

Variations in transmitter frequency may be tracked.

The transmitter frequency may be ascertained.

In a family of embodiments, power transfer may be varied, controlled or regulated.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any document in this specification does not constitute an admission that such document forms part of the prior art, common general knowledge or is validly combinable with any other document.

BRIEF DESCRIPTION OF THE DRAWINGS

The accompanying drawings, which are incorporated in and constitute part of the specification, illustrate embodiments and, together with the general description given above, and the detailed description of embodiments given below, serve to explain the principles of the invention.

DETAILED DESCRIPTION

Figure 1:
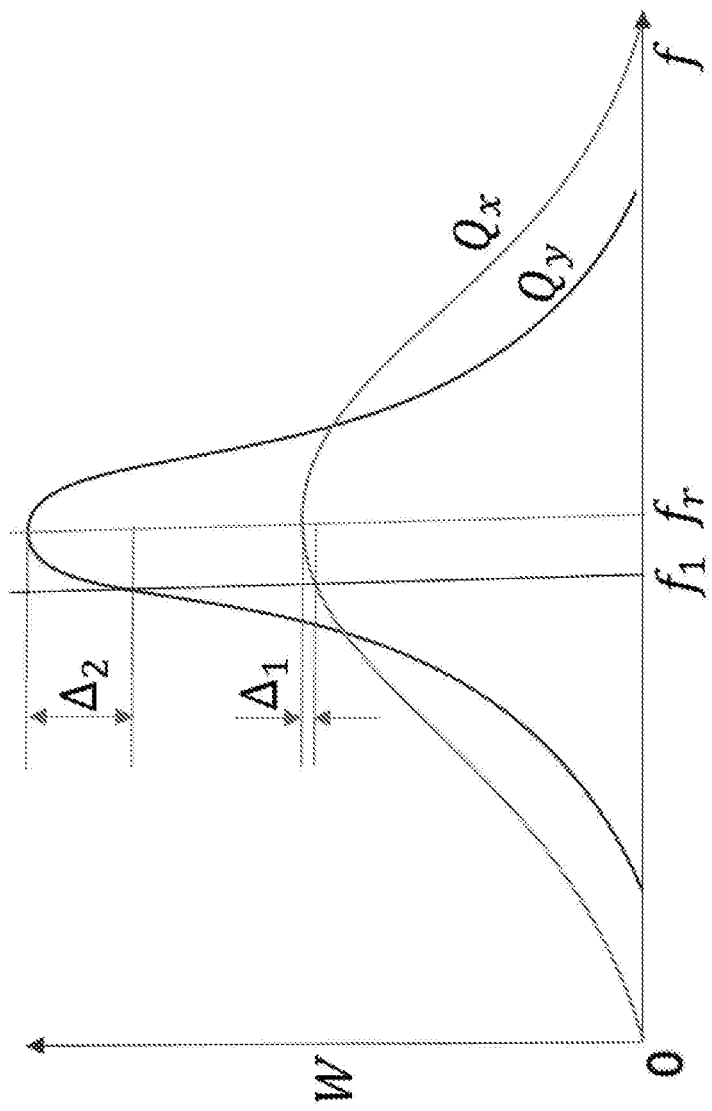
FIG. 1 shows a plot of two resonant characteristics plotting power against frequency.
Figure 2:
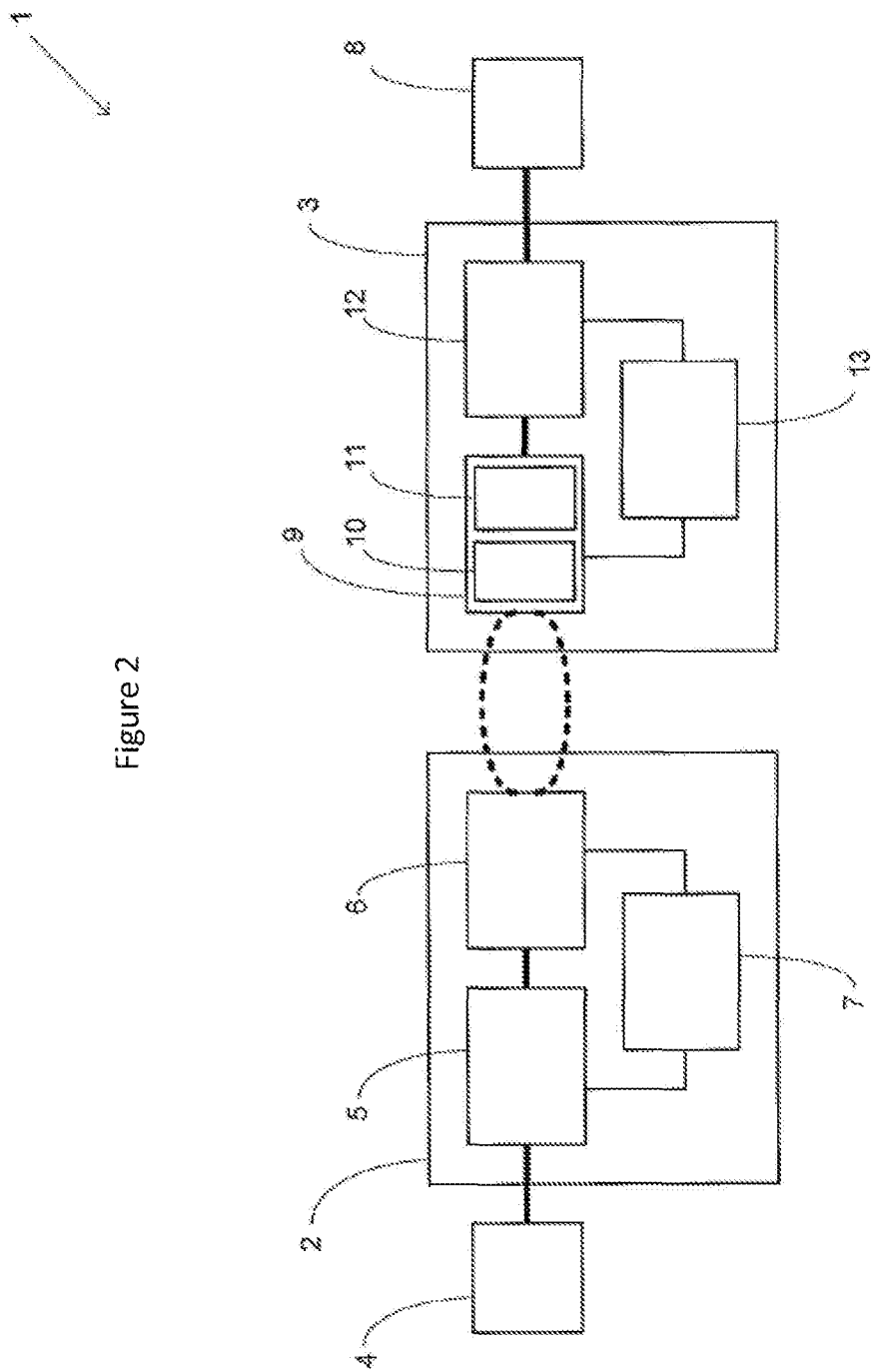
FIG. 2 shows a general representation of an inductive power transfer system.

FIG. 2 is a block diagram showing a general representation of an inductive power transfer system 1. The IPT system 1 includes a transmitter 2 and a receiver 3.

The inductive power transmitter 2 is connected to an appropriate power supply 4 (such as mains power). The inductive power transmitter may include transmitter circuitry 5. Such transmitter circuitry includes any circuitry that may be necessary for the operation of the inductive power transmitter depending upon the particular implementation of inductive power transmitter. The transmitter circuitry may include converters, inverters, startup circuits, detection circuits and control circuits.

The transmitter circuitry 5 is connected to transmitting coil(s) 6. The transmitter circuitry supplies the transmitting coil(s) with an alternating current such that the transmitting coil(s) generates a time-varying magnetic field with a suitable frequency and amplitude. Where the transmitting coil(s) are part of a resonant circuit, the frequency of the alternating current may be configured to correspond to the resonant frequency. Further the transmitter circuitry may be configured to supply power to the transmitting coil(s) having a desired current amplitude and/or voltage amplitude.

The transmitting coil(s) 6 may be any suitable configuration of coils, depending on the characteristics of the magnetic field that are required in a particular application and the particular geometry of the transmitter. In some IPT systems, the transmitting coils may be connected to other components, such as capacitors, to create a resonant circuit. Where there are multiple transmitting coils, these may be selectively energized so that only transmitting coils in proximity to suitable receiving coils are energized. In some IPT systems, it may be possible that more than one receiver may be powered simultaneously. In IPT systems, where the receivers are adapted to regulate the power provided to the load (as, for example, in the embodiments described in more detail below), the multiple transmitting coils may be connected to the same converter. This has the benefit of simplifying the transmitter as it does not need to control each transmitting coil separately. Further, it may be possible to adapt the transmitter so that it controls the power provided to the transmitting coils to a level dependent on the coupled receiver with the highest power demands.

FIG. 2 also shows a controller 7 of the inductive power transmitter 2. The controller may be connected to each part of the inductive power transmitter. The controller may be configured to receive inputs from parts of the inductive power transmitter and produce outputs that control the operation of each part of the transmitter. The controller may be implemented as a single unit or separate units. The controller may be a suitable controller that is configured and programmed to perform different computational tasks depending on the requirements of the inductive power transmitter. The controller may control various aspects of the inductive power transmitter depending on its capabilities, including for example: power flow (such as setting the voltage supplied to the transmitting coil(s)), tuning, selectively energizing transmitting coils, inductive power receiver detection and/or communications.

FIG. 2 also shows a general representation of a receiver 3. The inductive power receiver 3 is connected to a load 8. As will be appreciated, the inductive power receiver 3 is configured to receive inductive power from the inductive power transmitter 2 and to provide the power to the load. The load may be any suitable load depending upon the application for which the inductive power receiver is being used. For example, the load may be powering a portable electronic device or may be a rechargeable battery. The power demands of a load may vary, and therefore it is important that the power provided to the load matches the load's power demands. In particular, the power must be sufficient to meet the power demands whilst not being too excessive (which may lead to inefficiencies).

The receiver 3 includes a resonant circuit 9 that includes a receiving coil 10 and a tuning network 11. As will be appreciated, when the receiving coil is suitably coupled to the transmitting coil 6 of the transmitter 2, an AC voltage is induced across the receiving coil resulting in an AC current. Ultimately this power is provided to the load 8. The configuration of the receiving coil will vary depending on the characteristics of the particular IPT system for which the receiver is used.

The tuning network 11 is configured to adjust the impedance of the resonant circuit 9 and thus adjust the power received by the receiver 3 and provided to the load 8.

The resonant circuit 9 of the receiver is connected to a rectifier 12. The rectifier is configured to rectify the AC power of the resonant circuit to DC power that may be provided to the load 8. Many types of rectifier that may be used, for example in one embodiment, the rectifier may be a diode bridge. In another embodiment, the rectifier may consist of an arrangement of switches that may be actively controlled resulting in synchronous rectification.

FIG. 2 further shows a controller 13 of the inductive power receiver 3. The controller may be connected to each part of the inductive power receiver. The controller may be configured to receive inputs from parts of the inductive power receiver and produce outputs that control the operation of each part. In particular, the controller may control the tuning network as will be described in more detail below. The controller may be implemented as a single unit or separate units. The controller may be a suitable controller that is configured and programmed to perform different computational tasks depending on the requirements of the inductive power receiver. The controller may control various aspects of the inductive power receiver depending on its capabilities, including for example: power flow, impedance matching/tuning (as will be described in more detail below), and/or communications.

Figure 3:
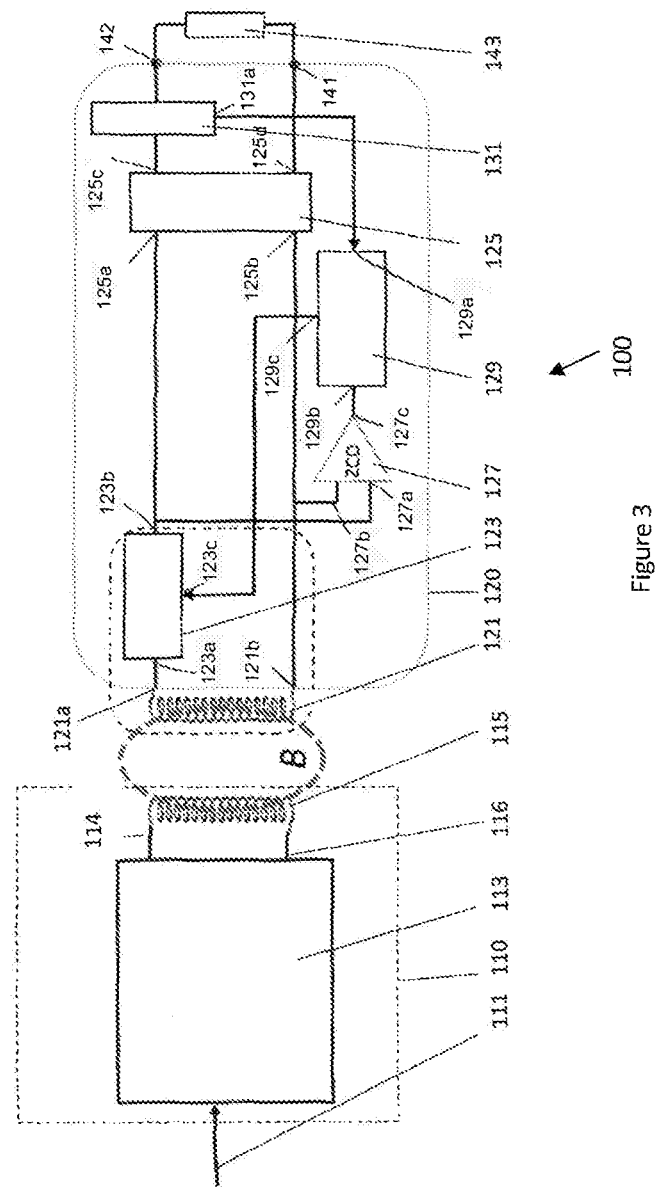
FIG. 3 shows a schematic diagram of an embodiment of an inductive power transfer system.

Having discussed an IPT system 1 in general (above), it is helpful to now discuss a particular embodiment of the system as shown in FIG. 3.

Referring to FIG. 3, an embodiment of an IPT system 100 has a transmitter 110 and a receiver 120. The transmitter comprises a transmit coil 115 and drive circuitry 113 having in this embodiment two output terminals 114,116 directly electrically connected to the transmit coil 115 for driving it. The transmitter 110 receives input electrical power 111 from a power supply, for example the mains (in this case) or a dc supply and converts the incoming power into an alternating frequency drive to the transmit coil 115. It will be understood that more than one coil may be provided, and more than one receiver may be provided.

The receiver 120 of the system 100 in this embodiment has a receiver coil 121 having two end terminals 121a, 121b, frequency control circuitry 123, rectification circuitry 125, two-input zero crossing detection circuitry 127, a controller 129, and power sensing circuitry 131. The receiver 120 has two output terminals 141, 142 for connection to a load 143. The frequency control circuitry 123 has in this embodiment an input terminal 123a and an output terminal 123b and is connected in series with the receive coil 121 at one end terminal 121a thereof. The output terminal 123b is connected to one input 127a of the zero crossing detection circuitry 127. The rectification circuitry 125 has two inputs 125a, 125b and two outputs 125c, 125d. One input 125b of the rectification circuitry 125 is connected to the other end terminal 121b of the receive coil, in this case directly, that is without intermediate circuitry. The other input 125a of the rectification circuitry 125 is connected to the output terminal 123b of the frequency control circuitry 123. One output 125d of the rectification circuitry 125 forms one output terminal 141 of the receiver 120. The other output 125c connects to the second output terminal 142 of the receiver 120 via power sensing circuitry 131. The power sensing circuitry 131 has an output 131a providing a signal indicative of power being consumed by the load 143, and this output 131a forms a first input 129a to the controller 129. A second input 129b of the controller 129 is provided by the output 127c of the zero crossing detection circuitry 127, whose second input 127b is connected to the other end terminal 121b of the receive coil 121. The controller 129 has a control output 129c connected to a control input 123c of the frequency control circuitry 123.

In embodiments, the frequency control circuitry 123 includes one or more components, such as variable capacitance diodes, saturable reactors and ferrites upon which the control output 129c acts to vary the frequency of operation, for example the frequency of resonance of the receiver. One or more frequency control components may be connected in series with the receiver coil 121, in parallel or a combination thereof.

In use, the transmit and receive coils are located sufficiently close to one another so that power can be transferred inductively from the transmit coil 115 to the receive coil 121. For the sake of ease of explanation the description that follows assumes that the two coils are disposed close to one another and at a substantially fixed relative disposition at the time the input power supply 111 is switched on. This will not always be a true reflection of the situation, as the power supply may already be on and, for example, one of the two coils may be moved from a sufficiently remote location that no power is transferred to a power transfer location in which power is transferred.

Figure 4:
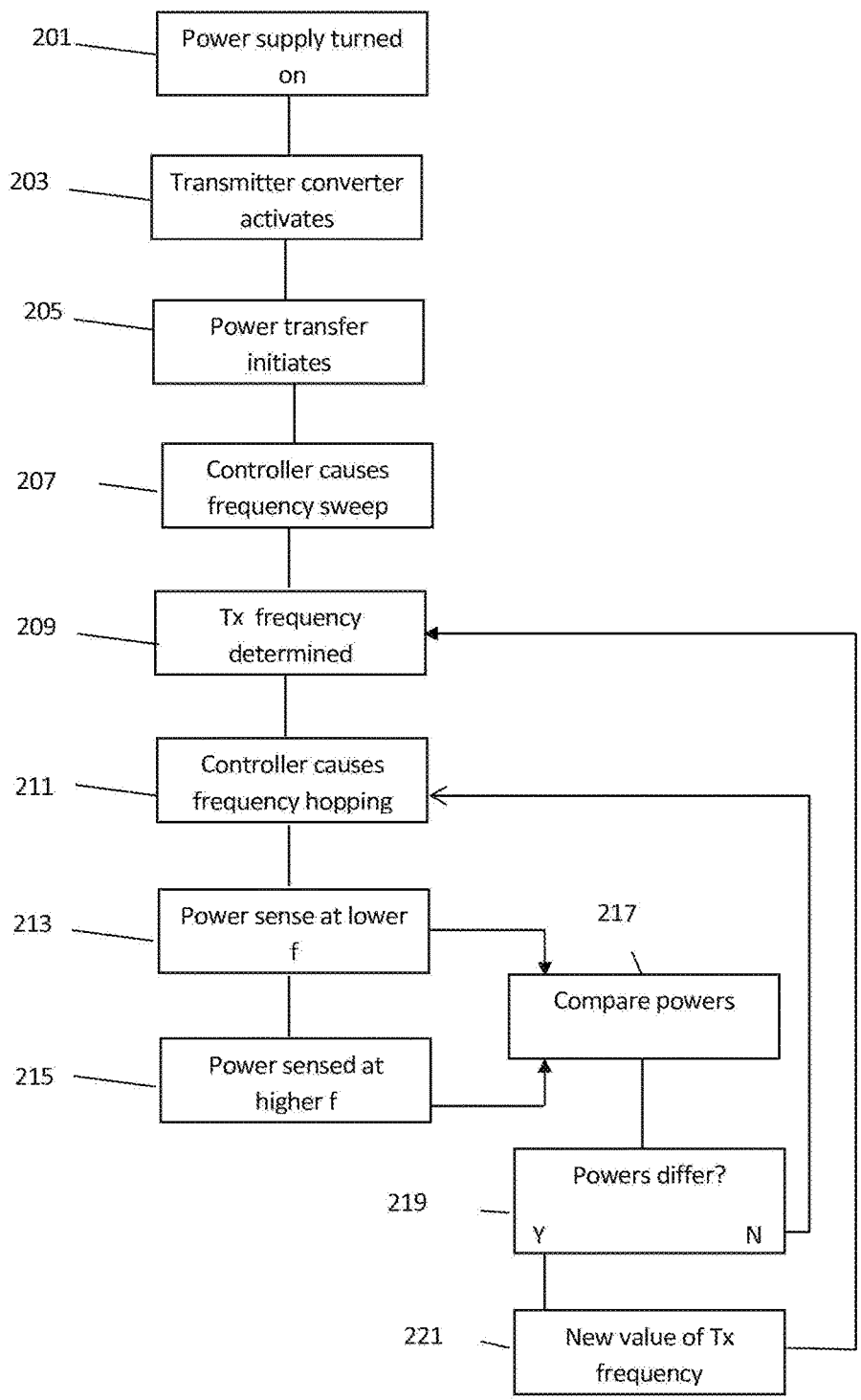
FIG. 4 shows a simplified flow chart.

Referring to FIG. 4, the power supply 111 is switched on (step 201). The converter activates (step 203) and provides ac, at a generally constant frequency to the transmit coil 115.

Power starts to transfer (step 205) to the receive coil 121 and this provides supply voltages via a power supply (not shown) for the remaining circuitry of the receiver 120.

The controller 129 is programmed in this embodiment to cause the frequency control circuitry 123 to carry out a frequency sweep (step 207). Typically the frequency control circuitry has a range of control about a nominal frequency of operation of the inverter. For example for an inverter frequency of 120 kHz, the frequency control circuitry may be designed to have a range between 100 kHz and 140 kHz. A smaller or a greater range is of course possible and depends upon the circuitry used and the situation.

In this embodiment, the controller 129 causes the frequency control circuitry to start at 100 kHz. In an embodiment where the receiver is based upon a resonant circuit, this means that the frequency control circuitry 123 adjusts the peak frequency, the resonant point of the receiver, to be 100 kHz.

As the frequency sweep progresses, the resonant frequency increases towards 140 kHz.

However, all the time the receiver is operating, the power sensing circuitry 131 is providing an indication of power transferred to the load 143, and this indication is fed-back to the controller 129. The controller 129 is programmed to monitor the power transferred in order to find a maximum power, at a maximum power frequency. Normal control techniques may be used to do this—for example hill-climbing techniques—but the aim is to find a genuine maximum power transfer frequency.

Once this frequency is established (step 209), the controller 129 stores a parameter representative of that frequency. Then, based upon that frequency, the controller controls (step 211) the frequency control circuitry 123 to cause the resonant frequency to hop in frequency alternately above and below that frequency. For example the maximum power frequency established at step 209 might be 120.5 kHz, and the controller 129 in that example could cause (step 213) the resonant frequency to be 120 kHz for a period equal to a few cycles, followed by (Step 215) a resonant frequency of 121 kHz for a similar period.

The controller 129 continues to receive indications of power transferred, the indication being via the power sensing circuitry 131, and is programmed to compare (Step 217) the two powers. If the power sensed in step 213 differs (step 219) from that in step 215, the controller is programmed to change (step 221) the perceived resonant frequency accordingly. For example, if the power in step 213 were higher than at step 215, the controller could cause the next "hops" to be between 119.8 kHz and 120.8 kHz. (These figures are entirely illustrative; the higher frequency could be used before the lower frequency, and that the variations in the "hops" will be determined according to circumstances).

If the powers (step 219) are equal or substantially equal then the controller causes the same hop frequencies to occur. The comparison of whether the powers are substantially equal will depend on the application requirements. For example, a threshold might be applied to the absolute difference in powers. Where the absolute difference in powers was above the threshold, the powers would be found to be non equal. Alternatively, a threshold might be applied to the relative difference in powers. A relative difference in powers of say 1%, 5%, or 10% may be used to determine whether the powers are substantially equal.

In this way, the controller causes the receiver to take into account changes in frequency of the transmitter. These include, but are not restricted to, environmental changes, aging, coupling conditions, the relative dispositions of the transmit 115 and receive 121 coils, changes in load. Especially where the transmitter is "soft switched", these and other factors may cause any resonant circuitry of the transmitter to vary in resonant peak frequency. However even for so-called "hard switched" transmitters the frequency of operation may vary.

Figure 5:
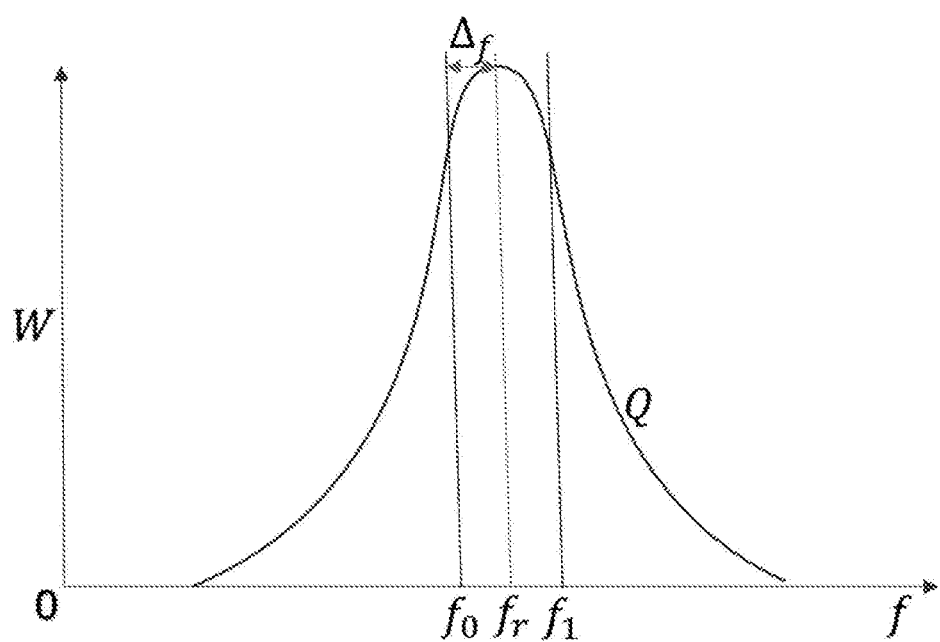
FIG. 5 shows a plot of a high-Q resonant characteristic, illustrating power control by frequency hopping.

Referring now to FIG. 5, a technique for regulation/control of the power output by the varying the resonant frequency of the receiver will be described. This can allow operation under varying load, temperature and coupling conditions without the losses associated with buck/boost regulation.

FIG. 5 shows the resonant tracking adjusted Q curve of the receiver where fr is the determined center frequency. The controller sets up two additional frequencies, f0 and f1 equidistant around fr so that the difference between fr and f0/f1 is Δf.

The controller 129 samples the power at f0 and f1. If they differ then fr is adjusted so that the power is kept equal. By this method the resonant frequency of the receiver is adjusted (tracking the transmitter) to compensate for changes in load, temperature and coupling conditions.

The controller 129 switches operating frequency in order to achieve the tracking as detailed. To adjust the power, the controller 129 adjusts the frequencies f0 and f1 with respect to fr, thereby adjusting Δf to regulate received power. Changes in load, temperature and coupling conditions can be automatically compensated for with this mechanism.

Other arrangements for varying the resonant frequency may be used, for example a switched capacitor network may substitute for a variable capacitor, or a variable inductor, saturable inductor or saturable ferrite may be employed instead of variable capacitance or as well as variable capacitance. In each case control can be effected via a control winding powered by a dc control current to set the saturable inductor into saturation or respectively to adjust the saturation point of the ferrite.

Embodiments may be designed that allows high-Q operation without derating; thus the maximum power capability can be enhanced. Embodiments may be designed in which no regulator as such is used, while power transfer can be controlled. In such embodiments the losses/heating of traditional regulators may be obviated. Embodiments may afford rapid response to sudden power/current needs.

The above example has been described with reference to an ac-ac-dc power transfer system. Other conversion may be employed, for example dc-ac-dc, dc-ac-ac.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power receiver comprising:
  inductive power receiving circuitry comprising a coil, the inductive power receiving circuitry having a resonant frequency; and
  a controller configured to:
    tune the resonant frequency to a first frequency;
    determine a first power produced using the inductive power receiving circuitry while the resonant frequency is tuned to the first frequency;
    tune the resonant frequency to a second frequency;
    determine a second power produced using the inductive power receiving circuitry while the resonant frequency is tuned to the second frequency;
    in accordance with a determination that the first power produced and the second power produced are within a threshold difference, tune the resonant frequency to at least one of the first frequency and the second frequency; and in accordance with a determination that the first power produced and the second power produced are not within the threshold difference, tune the resonant frequency to a third frequency.

2. The inductive power receiver of claim 1 wherein the inductive power receiving circuitry comprises a resonant circuit for setting the resonant frequency of the inductive power receiving circuitry and wherein the controller is configured to vary the resonant frequency of the inductive power receiving circuitry.

3. The inductive power receiver of claim 2 wherein the resonant circuit comprises a variable capacitor and wherein the controller is configured to control a capacitance of the variable capacitor to vary the resonant frequency of the inductive power receiving circuitry.

4. The inductive power receiver of claim 2 wherein the resonant circuit comprises a saturable reactor and wherein the controller is configured to control a reactance of the saturable reactor to vary the resonant frequency of the inductive power receiving circuitry.

5. The inductive power receiver of claim 1 wherein the inductive power receiving circuitry comprises a resonant circuit for setting the resonant frequency of the inductive power receiving circuitry, wherein the resonant circuit comprises a ferrite, and wherein the controller is configured to control a permeability of the ferrite to vary the resonant frequency of the inductive power receiving circuitry.

6. The inductive power receiver of claim 1, further comprising power sensing circuitry configured to provide a signal indicative of power transferred to a load, the power sensing circuitry having an output for the signal, and the controller having an input for the signal.

7. The inductive power receiver of claim 6, wherein the controller is further configured to select at least one of the first frequency and the second frequency based on the signal to control power transfer to the load.

8. The inductive power receiver of claim 1 wherein the controller is configured to initialize the inductive power receiving circuitry by causing the inductive power receiving circuitry to sweep a range of receiving circuitry resonant frequencies while monitoring the power received to determine a transmit frequency and wherein the first and second frequencies are centered about the transmit frequency.

9. The inductive power receiver of claim 1 wherein the threshold difference comprises a threshold selected from the group consisting of: a predetermined absolute threshold and a predetermined relative threshold.

10. A method of operating a receiver for an inductive power transfer (IPT) system, the receiver comprising inductive power receiving circuitry having a resonant frequency, the method comprising tuning the resonant frequency to a first frequency;
determining a first power produced using the inductive power receiving circuitry while the resonant frequency is tuned to the first frequency;
tuning the resonant frequency to a second frequency;
determining a second power produced using the inductive power receiving circuitry while the resonant frequency is tuned to the second frequency;
in accordance with a determination that the first power produced and the second power produced are within a threshold difference, tuning the resonant frequency to at least one of the first frequency and the second frequency; and
in accordance with a determination that the first power produced and the second power produced are not within the threshold difference, tuning the resonant frequency to a third frequency.

11. The method of claim 10, further comprising:
measuring a transmit frequency by sweeping a range of receiver resonant frequencies while monitoring a power received, wherein the first and second frequencies are centered about the transmit frequency.

12. The method of claim 11, wherein the transmit frequency is determined as the frequency at which maximum power is received.

13. The method of claim 10 further comprising selecting a spacing between the first and second frequencies to control power transfer to a load.

14. The method of claim 10 wherein the threshold difference comprises a threshold selected from the group consisting of: a predetermined absolute threshold and a predetermined relative threshold.

15. The inductive power receiver of claim 1, wherein the threshold difference comprises a threshold selected from the group consisting of: 1%, 5% and 10%.

16. The method of claim 10, wherein the threshold difference comprises a threshold selected from the group consisting of: 1%, 5% and 10%.

* * * * *